United States Patent [19]
Alfrey et al.

[11] Patent Number: 6,002,695
[45] Date of Patent: Dec. 14, 1999

[54] HIGH EFFICIENCY HIGH REPETITION RATE, INTRA-CAVITY TRIPLED DIODE PUMPED SOLID STATE LASER

[75] Inventors: Anthony J. Alfrey, Woodside, Calif.; Ed Sinofsky, Dennis, Mass.

[73] Assignee: DPSS Lasers, Inc., Santa Clara, Calif.

[21] Appl. No.: 08/656,371

[22] Filed: May 31, 1996

[51] Int. Cl.⁶ ...................................................... H01S 3/10
[52] U.S. Cl. ................................................................ 372/22
[58] Field of Search ........................... 372/21, 22; 359/326

[56] References Cited

U.S. PATENT DOCUMENTS

| | | | |
|---|---|---|---|
| 4,961,195 | 10/1990 | Skupsky et al. | 372/22 |
| 5,123,022 | 6/1992 | Ebbers et al. | 372/22 |
| 5,144,630 | 9/1992 | Lin | 372/22 |
| 5,206,868 | 4/1993 | Deacon | 372/21 |

Primary Examiner—Rodney Bovernick
Assistant Examiner—Robert E. Wise
Attorney, Agent, or Firm—Claude A. S. Hamrick; Oppenheimer W Donnelly

[57] ABSTRACT

A diode pumped laser wherein third harmonic generation at 355 nm is obtained from an intra-cavity-tripled diode-pumped Nd:YVO4 crystal utilizing an angle-tuned LBO doubler and tripler, and operated at high repetition rates and good overall efficiency. An average UV power of over 2 watts at 30 kHz and 1 watt at 100 kHz is typically obtained with a 20 watt diode array "bar" side-pumping a one percent (1%) Nd:YVO4 (vanadate) slab. The device utilizes room temperature intra-cavity doubling and takes advantage of a small beam waist at the doubler and tripler required with low-power CW diode pumping.

42 Claims, 8 Drawing Sheets

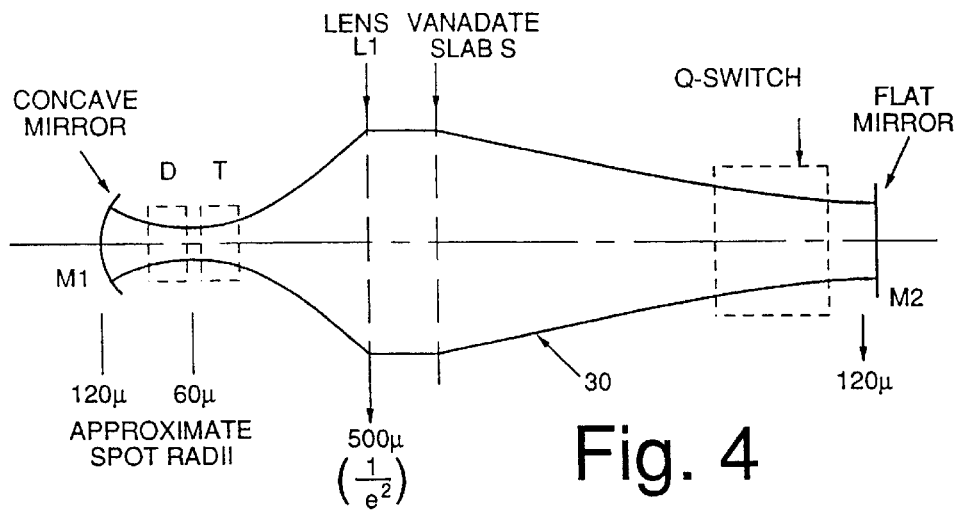
Fig. 4
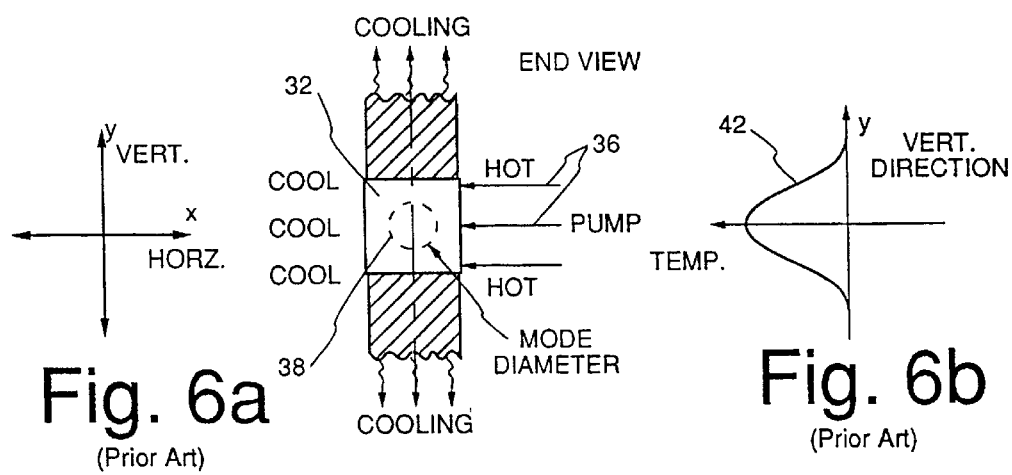
Fig. 6a (Prior Art)
Fig. 6b (Prior Art)
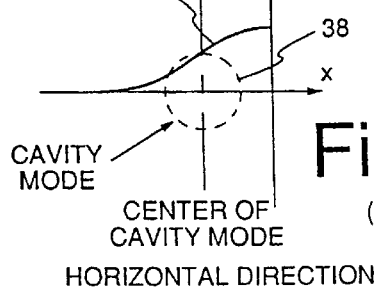
Fig. 6c (Prior Art)
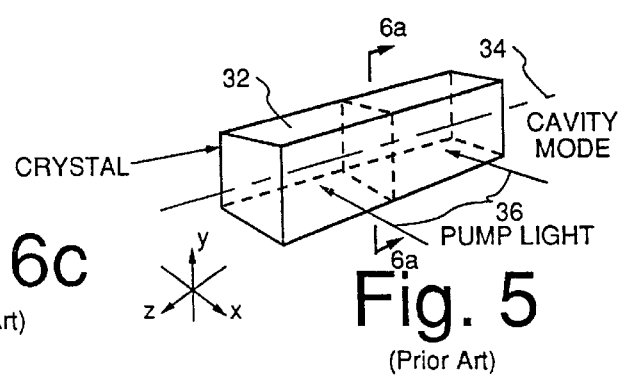
Fig. 5 (Prior Art)

HIGH EFFICIENCY HIGH REPETITION RATE, INTRA-CAVITY TRIPLED DIODE PUMPED SOLID STATE LASER

BACKGROUND OF THE INVENTION

1. Field of the Invention

The present invention relates generally to diode pumped laser apparatus, and more particularly to an improved intra-cavity tripled diode pumped Nd:YVO4 laser utilizing an angle-tuned LBO doubler and tripler and operated at high repetition rates and good overall efficiency.

2. Brief Description of the Prior Art

Laser radiation at 355 nm with high average power and high repetition rate (above 10 kHz) is useful for applications such as stereo lithography in which a UV-sensitized liquid polymer is laser-scanned and solidified to form solid models of complicated computer-generated mechanical parts in a layer-by-layer fashion. Third harmonic generation of the nominally 1 micron output from Nd:Host materials operated in high repetition rate Q-switched cavities have been obtained in the prior art using extra-cavity architectures such as that illustrated in FIG. 1 of the drawing. As schematically shown at 10, such a laser typically consists of a pair of cavity mirrors M1 and M2, some sort of diode-pumped gain medium S, and an intra-cavity Q-switch Q. The output of the laser operating at a wave length of 1064 nm passes from M1 out to a suitable lensing means L1 and is focused into a doubler D which generates a second harmonic at 532 nm along with the remaining fundamental at 1064 nm. The fundamental and second harmonic are then focused by a second lens means L2 into a tripler T where a third harmonic radiation is generated at 355 nm. Appropriate means not shown but well known in the art is then used to separate out the third harmonic radiation from the fundamental and second harmonic. Relatively narrow fundamental pulse widths (10–20 ns) and non-critically phase-matched (NCPM) doubling allows good conversion efficiencies to be obtained with Lithium triborate (LBO) as an extra-cavity type I doubler and type II sum-frequency tripler. However, operation of the NCPM doubler at the phase match temperature of 150° C. may complicate the optical and mechanical design in systems which require close spacing between a doubler and tripler with widely different temperatures. It is therefore believed that certain advantages and improvements could be obtained with an totally intra-cavity architecture. Whereas diode pumped lasers are often doubled and tripled extra-cavity, intra-cavity doubling/tripling has been demonstrated with arc lamp pumping. In addition, others have performed intra-cavity doubling followed by extra-cavity tripling. However, it has been shown that angle-tuned LBO may be used at room temperature for efficient intra-cavity second harmonic and third harmonic generation in a flash lamp pumped Nd:YAG cavity at relatively low repetition rates (below 1 kHz). The high fundamental intra-cavity peak power achieved with the lamp pumping permits the use of relatively simple cavities with few optical components and slowly varying spot sizes. We are not aware of any diode pumped solid state lasers using intra-cavity doubling and tripling within a single cavity.

In an intra-cavity architecture, the fundamental beam and UV (tripled) beam are co-linear and must be separated. Previously, this has been done by using mirrors with special coatings that imperfectly transmit the UV while reflecting the intra-cavity fundamental. Improvements must thus be made in separating the UV beam from the fundamental. In intra-cavity doubled standing wave multi-mode lasers, two second harmonic beams are produced in a doubler, and only one of these beams is readily available for further use. Although a mirror can be used to recycle one of these beams to overlap the first, dispersion in air can introduce a phase shift between the beams, reducing the effective power of the overlapping beams. Means must therefore be provided for dealing with this phase shift problem.

Acousto-optic Q-switches operated at high power are usually water-cooled and, if used intra-cavity, would require that flexible cooling lines extend into the cavity to allow the necessary rotation and translation of the switch for correct optical alignment. An intra-cavity architecture therefore would require an alternative means of cooling the Q-switch if it is desired to remove water cooling tubing from within the laser cavity enclosure.

In order to improve the pumping efficiency in a side-pumped solid state laser, pump mode and cavity mode overlap can be achieved by a shallow bounce off of a pumped face. However, efficient operation depends upon high pump absorption coefficient and shallow bounce angle. Therefore, a long collimated pumping source placed tightly against the pumped face has been used with the result that diffraction losses (beam clipping) occurs at the ends of the slap unless the slab is considerably longer than the pumping length. In addition, side-pumped slabs and rods often yield poor laser mode profiles and poor efficiency because of non-uniform thermal lensing induced by asymmetric pumping profiles and non-uniform thermal boundaries. Previous solutions to this problem have included the use of cylindrical lenses to provide elliptical cavity modes to compensate for asymmetric thermal lensing. The provision of an intra-cavity architecture therefore requires consideration of multiple design considerations.

SUMMARY OF THE INVENTION

Briefly, in accordance with a presently preferred embodiment of the present invention third harmonic generation at 355 nm is obtained from an intra-cavity-tripled diode-pumped Nd:YVO4 crystal utilizing an angle-tuned LBO doubler and tripler, and operated at high repetition rates and good overall efficiency. An average UV power of over 2 watts at 30 kHz and 1 watt at 100 kHz is typically obtained with a 20 watt diode array "bar" side-pumping a one percent (1%) Nd:YVO4 (vanadate) slab. The device utilizes room temperature intra-cavity doubling and takes advantage of a small beam waist at the doubler and tripler required with low-power CW diode pumping.

The advantages of the present invention will no doubt become apparent to those skilled in the art after having read the following detailed description of the preferred embodiment which is illustrated in the several figures of the drawing.

IN THE DRAWING

FIG. 4 is a diagram schematically illustrating the intra-cavity beam profiles of the present invention;

FIGS. 5 and 6a–6c illustrate the mode mechanics of a side-pumped laser crystal;

Figure 12:
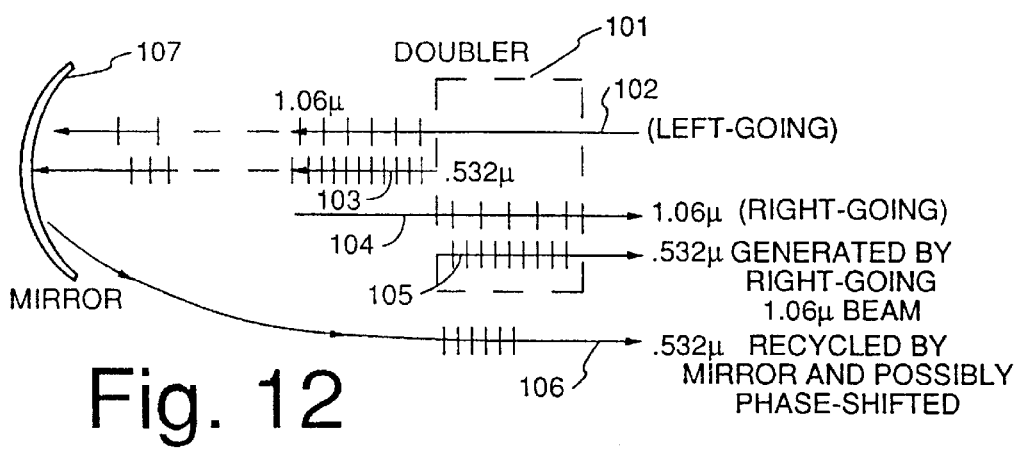
Figure 13:
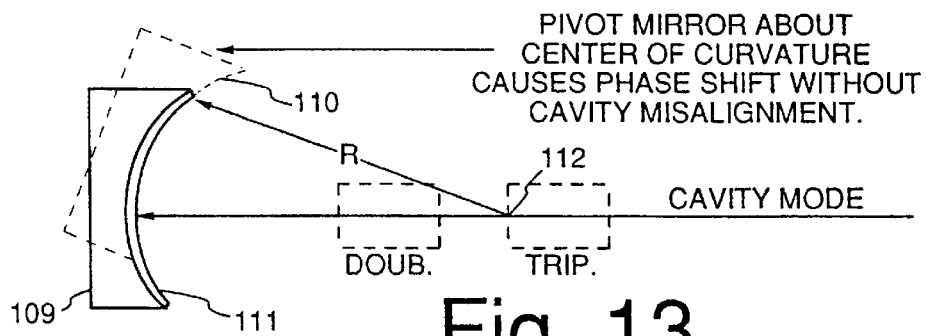
Figure 14:
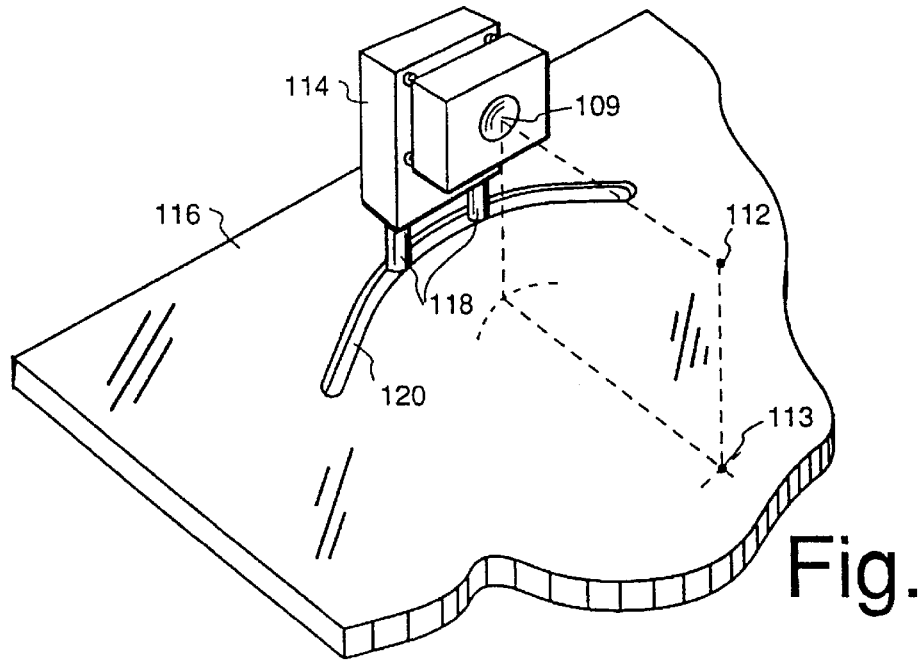
Figure 15:
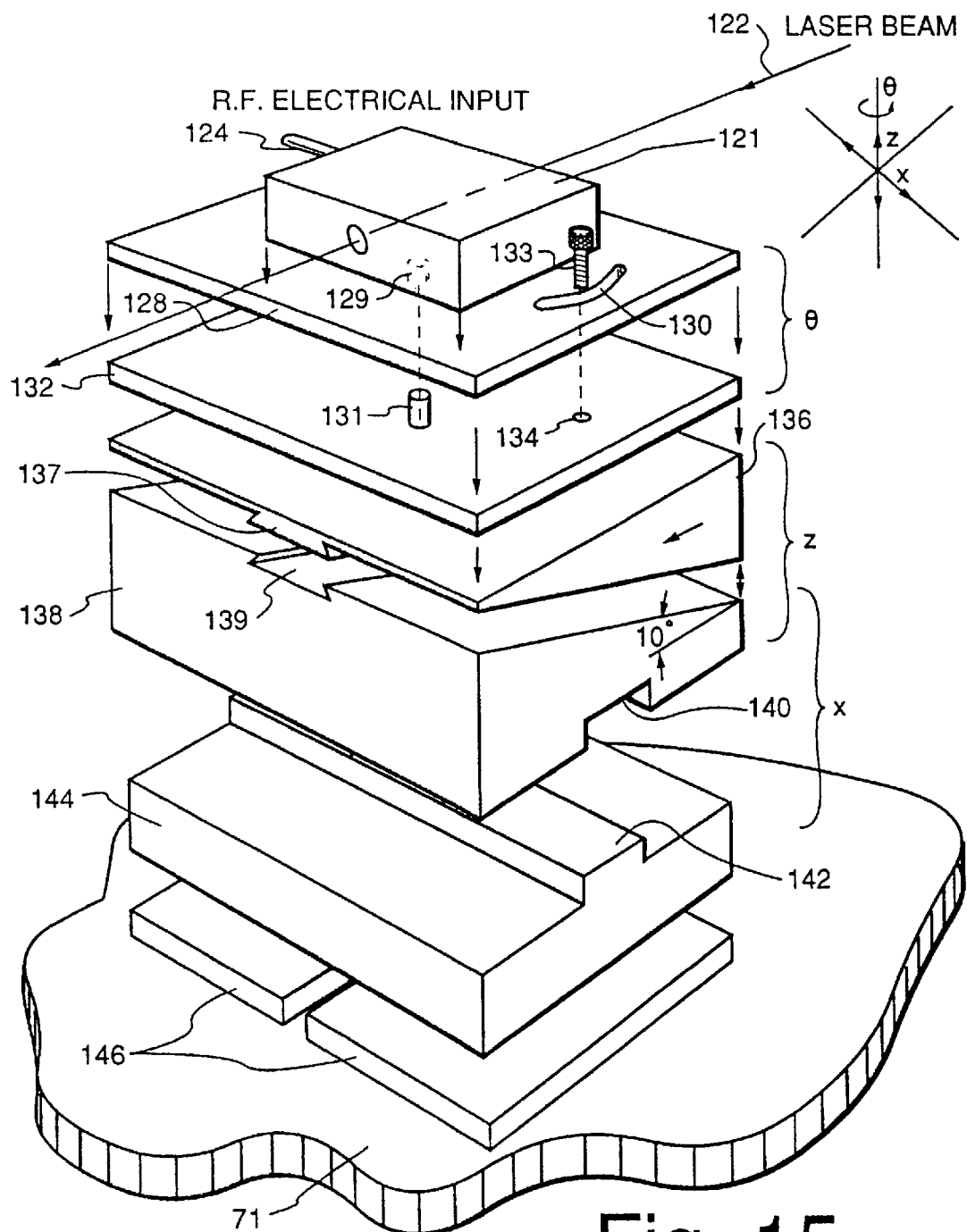

FIGS. 12 and 13 schematically illustrate a phase shift compensation technique in accordance with the present invention;

FIG. 14 depicts an actual implementation of the phase shift compensator described in FIGS. 12 and 13; and FIG. 15 is an exploded view illustrating a Q-switch mount in accordance with the present invention.

DETAILED DESCRIPTION OF THE PREFERRED EMBODIMENT

Figure 1:
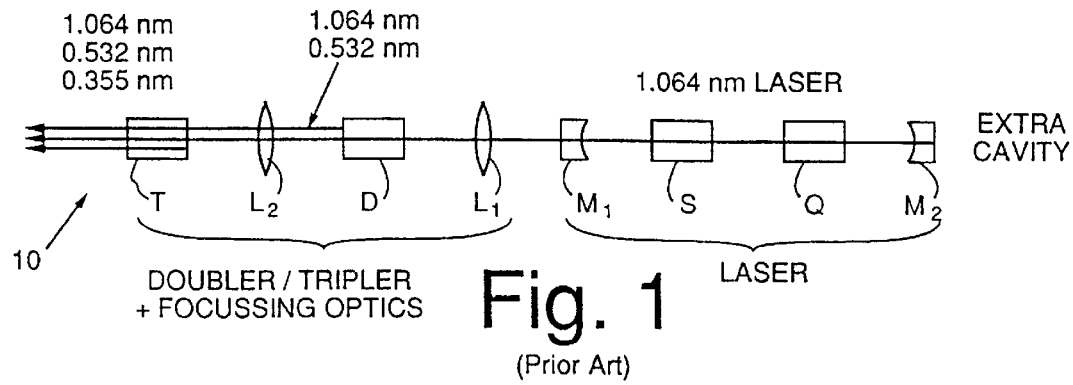
FIG. 1 is a diagram schematically illustrating a prior art UV laser using extra-cavity doubling and tripling.
Figure 2:
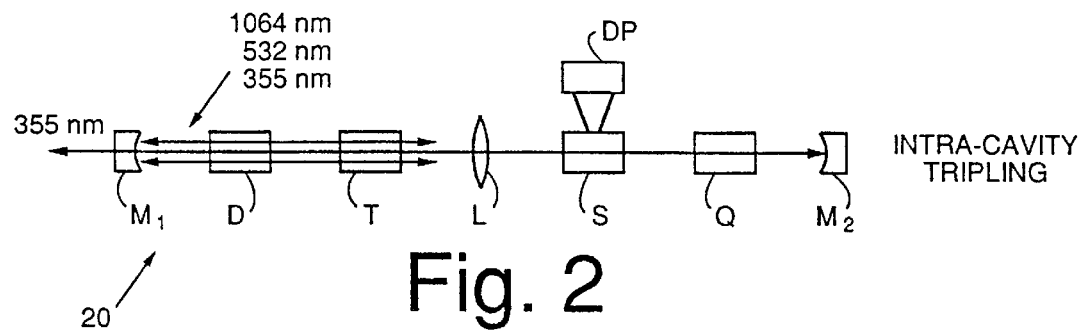
FIG. 2 is a diagram schematically illustrating the basic components of an intra-cavity UV laser architecture in accordance with the present invention.

In FIG. 2, a diode-pumped solid state laser with intra-cavity tripling in accordance with the present invention is generally illustrated at 20. As illustrated, the device includes doubling and tripling crystals D and T, respectively, additional lensing L, a diode-pumped (DP) laser crystal S and a Q-switch Q are all contained within a single cavity defined by mirrors M1 and M2. Fundamental radiation is generated at 1064 nm, and within the cavity itself second harmonic radiation at 532 nm is generated, as is a third harmonic at 355 nm. In the optimal case, the mirror M1 is coated in such a way as to only permit the output coupling of 355 nm light. However, it is not easy to generate coatings that will both reflect the 1064 mn wave length and the 532 nm wave length and at the same time efficiently pass the 355 mn or third harmonic wave length radiation.

Figure 3:
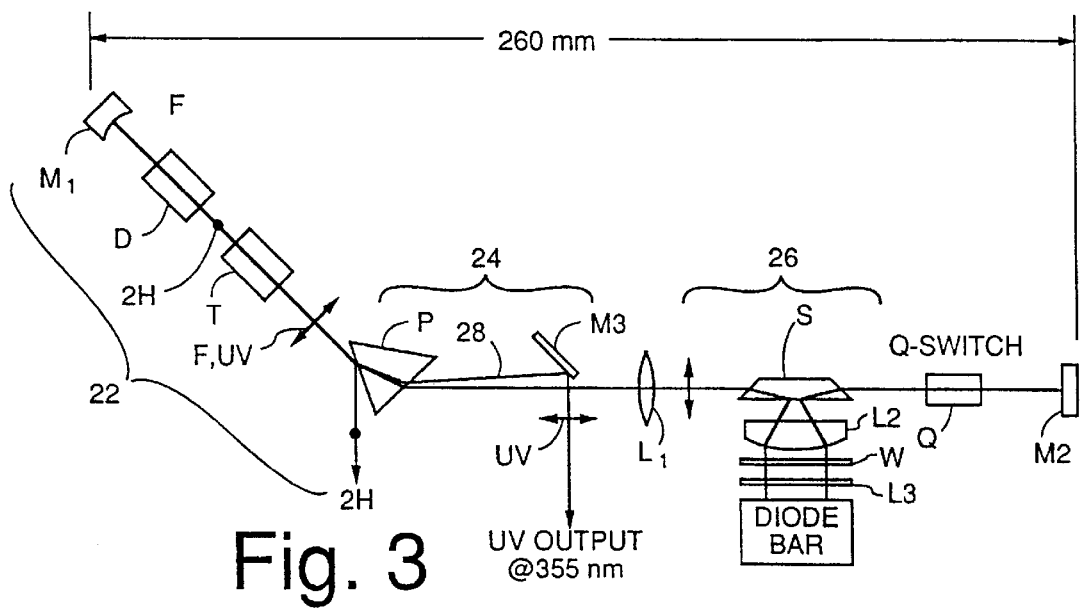
FIG. 3 illustrates the actual components used in implementing the intra-cavity architecture of FIG. 2.

Accordingly, the preferred embodiment of the present invention is implemented in the slightly variant form illustrated in FIG. 3 of the drawing, which in addition to those elements indicated in FIG. 2, also includes additional features to extract the 355 nm radiation efficiently without disturbing the fundamental at 1064 nm or the second harmonic at 532 nm. As with the laser generally illustrated in FIG. 2, this embodiment includes an intra-cavity Q-switch Q, some type of diode-pumped slab medium S, intra-cavity lensing L1, intra-cavity doubler D, intra-cavity tripler T, and cavity mirrors M1 and M2. In addition, this embodiment includes a prism P and a pick-off reflector M3. As will be further described below, the number 22 encompasses components which encompass some of the phase-shift correction issues, the number 24 points out the pick-off components, and the number 26 encompasses means for providing a thermally symmetric environment to improve the efficiency of the laser. As suggested by the two-headed arrows, the fundamental at 1064 nm is electrically polarized in the plane of the drawing passing with negligible loss through prism P and into doubler D and tripler T. The arrows also suggest that both the fundamental and the UV are co-polarized in the plane of the page. At the prism P, because the green light of the second harmonic (2H) is in S-polarization with respect to the prism's surface, much of the green light is reflected off of that prism surface. However, this is not of concern because the green light has already been used at the tripler T to generate the third harmonic (UV). The third harmonic is transferred with very little loss through the prism P and is deviated thereby at a slight angle with respect to the fundamental, as indicated at 28, and then extracted with the UV pick-off mirror R and extracted from the cavity without loss.

FIG. 4 schematically illustrates the size of the beam within the cavity as it passes through the various intra-cavity elements. The cavity has been straightened out and aligned without the dogleg due to the prism simply to aid in viewing of the cavity beam profiled. For efficient generation of the 1064 nm fundamental the cavity mode is made as large as possible within the vanadate slab S; for efficient generation of the second and third harmonics, spot size is as small as convenient and is somewhat dependent upon the length of the crystals chosen for the doubler D and tripler T. For the chosen crystals the beam size has an approximately $60\mu$ radius (referred to in the literature as $1/e^2$ radius) at the doubler and tripler, expanding at the concave mirror M1 to approximately $120\mu$. The beam expands in the direction of the middle of the cavity where the intra-cavity lens L1 and the vanadate slab S are located. At this point the beam is expanded to approximately $500\mu$. Note that the spot size is relatively constant between the lens L1 and the slab S, after which it is once again focused by the thermal lensing in the vanadate slab to a relatively large spot at the flat mirror M2 at the far end of the cavity and has a spot radius of approximately $120\mu$. The Q-switch is placed in front of the flat mirror M2 where the spot size is relatively small, but it is not absolutely essential that the Q-switch be placed immediately adjacent to the mirror.

The small waist for the LBO doubler/tripler pair (D and T, respectively) is formed by the combination of the intra-cavity lens L1 and the concave mirror Ml. The large cavity mode of approximately $500\mu$ is maintained within the Nd:YVO4 slab S to provide efficient mode overlap with the broad pump volume offered by the focused diode bar, as will be further explained below. The choice of pump volume is critical to achieving a uniform thermal lens within the slab and is described herein below. Moreover, the combination of the thermal lens with the Nd:YVO4 and a portion of the focusing power of the lens L1 are used to form the second small waist at the front mirror M2. The acousto-optic Q-switch is placed near the second waist to reduce the RF power requirements of the switch. $TEM_{00}$ operation is selected by an appropriate ratio of the cavity mode size to the aperture represented by the Nd:YVO4 slab. As suggested above, the third harmonic radiation, polarized co-planar to the fundamental radiation, is extracted with negligible loss by the combination of the intra-cavity Brewster prism P and the pick-off mirror M3.

As indicated above, the present invention utilizes a diode-pumped laser crystal in which the crystal is side-pumped. Since the present invention utilizes a novel method of side-pumping, it is deemed useful to first discuss the typical prior art side-pumping technique so as to provide means for comparison between the prior art and the present invention. In the past, the typical side-pumped laser crystal usually took the form of a pencil-like rod or a relatively long rectangular bar, as depicted at 32 in FIG. 5 of the drawing. The cavity mode passes longitudinally through the center of the crystal, as indicated by the centered line 34. Pump light indicated by the arrows 36 is normally incident from one side and is usually provided by some sort of diode array. FIG. 6a is a cross-section taken along the plane 6a—6a and further indicates that, whereas the laser crystal 32 is pumped from the right side with the left and right sides being open to the free air. The dotted circle 38 suggests the laser cavity mode propagating through the crystal, the important point being that the cavity mode must be removed some distance from the sides of the crystal so as not to cause diffraction losses (sometimes referred to as clipping losses).

To the right of FIG. 6a, FIG. 6b shows a plot of temperature within the laser crystal versus the position in the Y or vertical direction.

FIG. 6c also shows a temperature profile regarding position except that in this case it is with respect to the X or horizontal position.

Pump light is absorbed in the laser crystal 32, and the way in which it is absorbed depends upon the type of laser crystal and the doping of Neodymium ions. Because the pump light is supplied preferentially from one side, that side is hotter while the opposite side is colder, as suggested in FIG. 6a. The key feature to note is that when the temperature profile 40 is compared with the shape of the cavity mode 38 in FIG. 6c, the temperature is higher on the right side of the cavity mode and lower on the left side of the cavity mode, resulting in extreme asymmetry in the thermal lensing caused by the difference in temperature between the right and left sides. Additionally, referring to FIG. 6b, the temperature profile 42 in the vertical direction is clearly seen to be highest in the middle and lowest at the upper and lower cooled surfaces. The net effect of these two temperature profiles in the vertical and horizontal directions yields a strong cylindrical lens in the vertical direction and a highly asymmetric lens in the horizontal direction. These two effects make it difficult to control the cavity mode size and difficult to control beam quality produced by such a laser. As a result, cavity mode sizes are often made small with respect to the size of the laser crystal and the size of the pumped volume, thereby resulting in inefficient operation and power extraction from the laser.

Figure 7A:
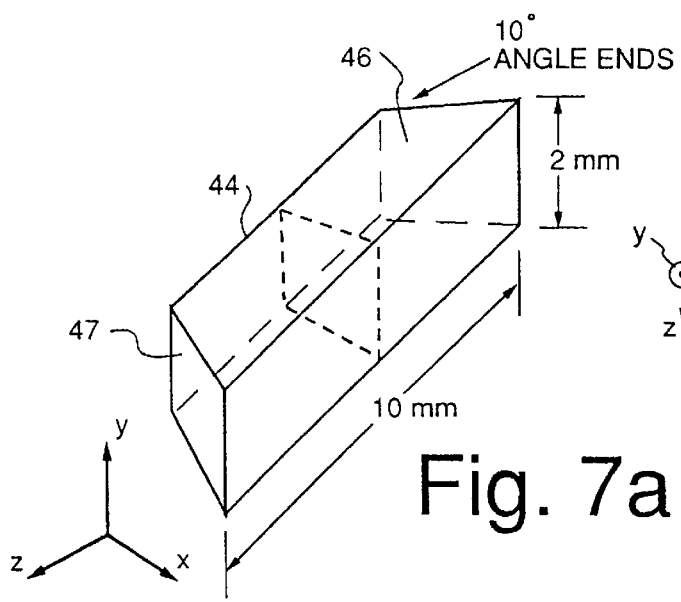
FIGS. 7a–7e and 8a–8b illustrate the mode mechanics of a side-pumped laser crystal in accordance with the present invention.
Figure 7B:
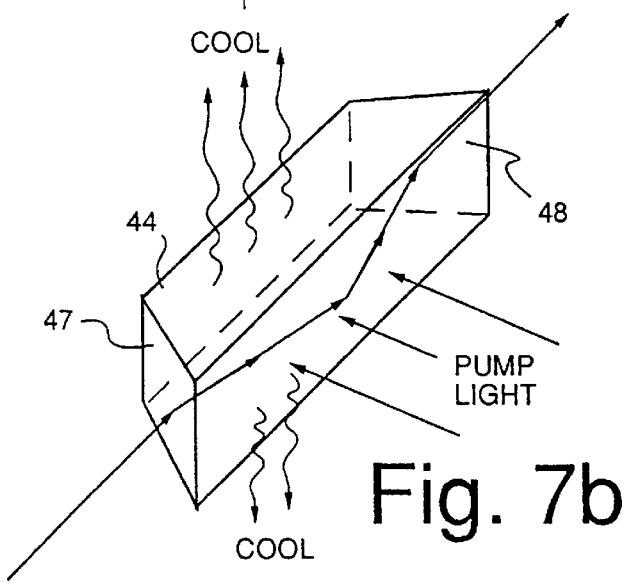
Figure 7C:
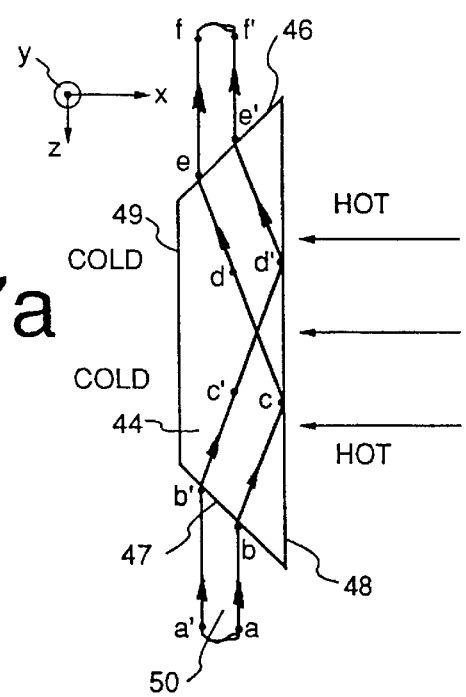

Referring now to FIGS. 7a–7c, a crystal of the type used in accordance with the present invention is illustrated at 44. The crystal 44 is of Neodymium yttrium orthovanadate (Nd:YVO4) doped at one percent (1%) with Neodymium ions. The crystal is approximately 2 mm square in transverse section by about 10 mm long. As with the prior art crystal of FIG. 5, the crystal 44 is held in a mechanical clamping device which cools its upper and lower surfaces, as suggested in FIG. 7b. Pump light is incident on the laser crystal from the right side, and the opposite side is open to free air. Because the pumping light is preferentially applied from one side only, the right side of the crystal is relatively hot, the left side of the crystal is relatively cool, and the upper and lower surfaces of the crystal are the coldest parts because they are in direct mechanical contact with a cooling reservoir, as will be further described below. The end surfaces 46 and 47 are cut transversely at about a 10° angle so that as the cavity mode propagates through the crystal, it is refracted at the face 47, reflects from the pumped side 48, and finally exits the face 46 at the opposite end of the slab. The size of the cavity mode at this internal bounce with respect to the size of the pump illumination is crucial to thermal optimization. In FIG. 7c, which is a plan view of the crystals depicted in FIG. 7a and 7b, the left and right extremes of the cavity mode 50 are shown as the mode propagates through the crystal 44. Note that since the pumped face 48 is hot and the opposite face 49 is cold, the average temperature profile across the crystal will be as indicated in FIG. 7e where the dashed lines 48 suggest an end or cross-sectional view of crystal 44 and the dashed circle 50 corresponds to the cavity mode. However, note that in passing from one end of the crystal to the other, the path a–f on one side of the incident beam, and similarly the path described by a'–f', reverse positions such that although the right side of the crystal is hot compared to the left side, the bounce at the face 48 of the laser crystal causes essentially an inversion of the beam with the result that the average temperature seen by both sides of the beam is the same as long as the pumping is substantially uniform in the Z direction.

Figure 7D:
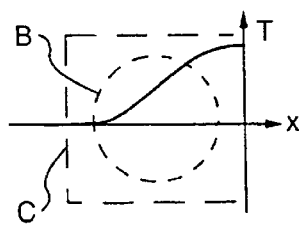
Figure 7E:
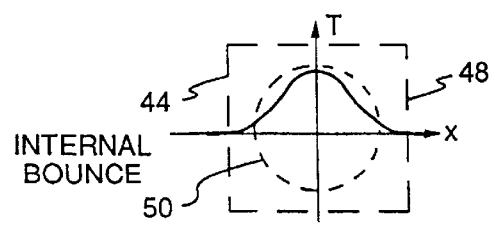

FIG. 7d illustrates the average temperature profile across the beam B in the case of the traditional side-pumped crystal C for purposes of comparison to the averaged thermal profile of the internally bounced beam 50 of the side-pumped crystal 44 of FIG. 7e. This reduction of asymmetry depends markedly on the pump profile being uniform in the Z direction and centered on the point at which the intra-cavity beam bounces internally off of the pumped face 48.

Figure 8A:
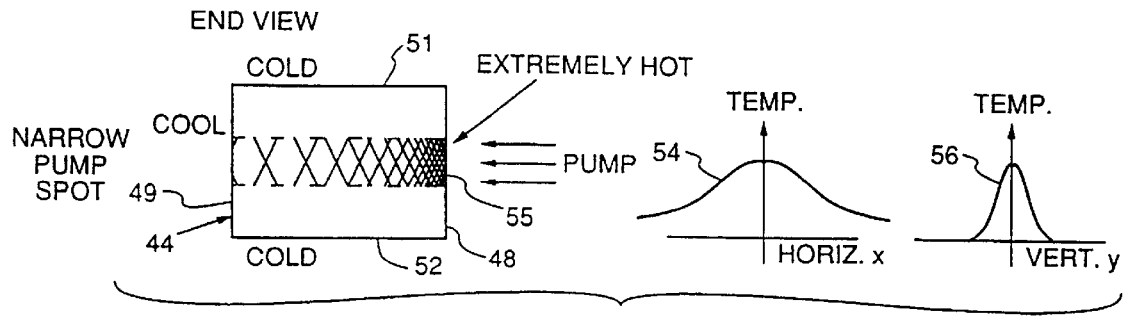
Figure 8B:
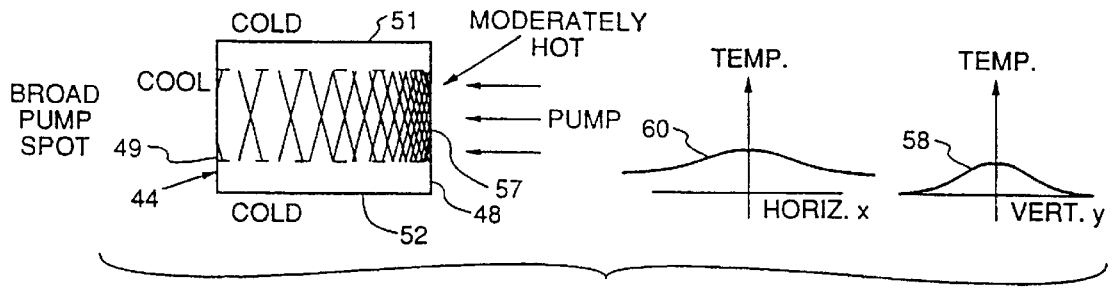

FIGS. 8a and 8b illustrate that even further improvements can be made by the proper selection of the size of the pumping profile versus the size of the vertical dimensions of the crystal itself. A cross-sectional view of the laser crystal is depicted at 44 in FIG. 8a, illustrating the cooled sides 51 and 52, the pumped side 48, and the opposite side 49 open to free air. To the right of FIG. 8a the averaged horizontal and vertical temperature profiles are shown at 54 and 56, respectively. It is these profiles which generate horizontal and vertical thermal lensing components. It is important to note that the profile in the horizontal direction is symmetrized by the reflection off of 48 and that these profiles represent average temperature profiles, the average being taken by a summation along a series of cross-sectional "slices" taken along the beam path. The curves 54 and 56 describe the temperature profiles developed by a narrow pump spot 55; "narrow" here means small compared to the dimensions of both the crystal itself and with respect to the rate at which the pumping profile is attenuated from the right side to the left side of the crystal. The pumping profile is very narrow compared to the vertical dimensions of the crystal 44 and even smaller than the distance over which the pumping profile is attenuated from the right to the left side of the crystal.

In FIG. 8b the pumping profile is selected to be very broad, in this case almost as broad as the vertical dimension of the crystal itself. Again, the rate at which the pumping profile is attenuated from the right to the left does not substantially change, because this factor is controlled mainly by the particular laser crystal used and the particular wave length of pumping light selected. The temperature profile in the horizontal direction is controlled largely by the pump absorption which is in turn controlled by the absorption coefficient for the particular pumping laser light wave length that has been selected. Whereas the temperature profile in the vertical direction is controlled by the spot size and in fact is controlled by the ratio of the spot size selected versus the size of the crystal between the two cooled faces 51 and 52, if one examines the temperature profiles caused by the narrow pump spot size of FIG. 8a, it can be seen that the temperature profile in the vertical direction is more rapidly changing than the temperature profile in the horizontal direction. This implies that there is going to be a greater thermal lensing in the vertical direction than in the horizontal direction, resulting in asymmetry in the amount of thermal lensing between the horizontal and vertical planes. This asymmetry in thermal lensing will in turn require a counteracting asymmetry either in the size and shape of the cavity mode or in other optical elements that might be placed within the laser cavity to counteract or compensate for the asymmetric lensing. The opposite effect is shown in FIG. 8b wherein the broad pump spot 57 generates a vertical temperature profile 58 that slowly varies in comparison to the horizontal temperature profile 60. The concept is that if the pump spot is selected in appropriate size compared to both the vertical dimension of the crystal and the pump absorption coefficient, a thermal lensing profile can be generated which is largely symmetric in the horizontal and vertical directions. Calculation of the correct pump spot size with respect to the dimensions of the crystal is too complicated to be accomplished analytically and is typically done by computer modeling. It can also be performed experimentally by applying a variety of different pump spot sizes to the crystal and observing how the laser performs, i.e., knowing what sort of thermal lensing is apparent in the laser and how this thermal lensing affects the cavity mode. Alternatively, the pumped crystal can be removed from the entire laser itself and diagnostics can be performed thereon to ascertain what sort of thermal lensing profile there is in the crystal, thereby allowing the user to properly adjust the size of the pumped spot.

In summary, temperature profile in the horizontal direction is controlled by pump absorption (absorption coefficient), and temperature profile in the vertical direction is controlled by the spot size. By balancing these two effects, one can obtain a uniform temperature profile across the beam profile with symmetric thermal lensing and fewer special optics required.

Figure 9:
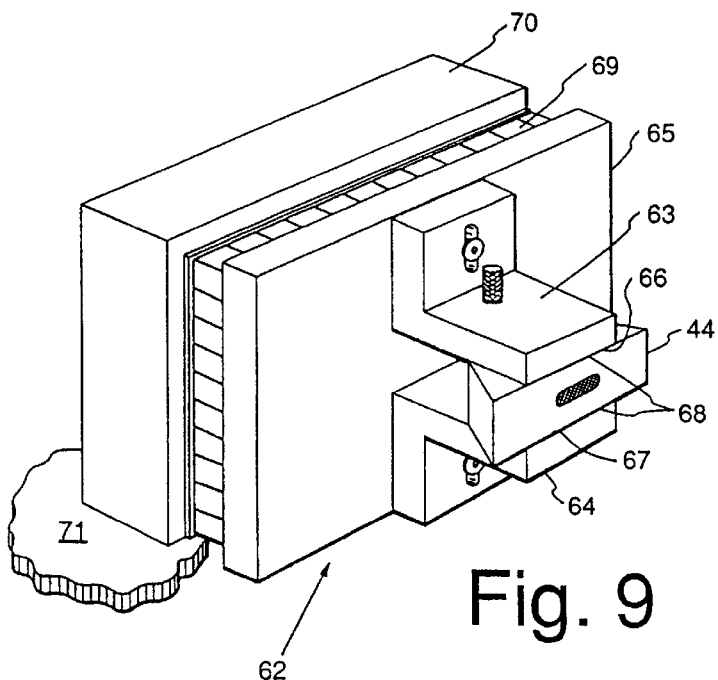
FIG. 9 depicts an improved electro-thermally cooled laser mount in accordance with the present invention.

Referring now to FIG. 9, an assembly used in the preferred embodiment for holding and cooling the crystal 44 is shown at 62. The way in which the crystal 44 is held is extremely important in maintaining a uniform cooling and uniform pump illumination, and thus is important to proper implementation of the thermal optimization technique of the present invention. Two angle-shaped mechanical clamps 63 and 64 are adjustably affixed to a copper plate 65. Disposed between the clamping faces 66 and 67 are thin pieces of indium foil 68 for providing a stress-free yet thermally uniform contact between the crystal 44 and the cooling clamps 63 and 64. The uniformity of the contact between the crystal and the clamping faces is extremely important. The indium foil is soft and allows for some minute irregularities between the clamping surfaces to be compensated for by the foil which tends to fill small imperfections in mating surfaces. Imperfections are inevitable when machining and fabricating the crystal. Although slight imperfections in a crystal's surfaces can be removed by extremely expensive fabrication, such imperfections can in the alternative be compensated for using the indium foil as illustrated. This of course does not preclude the use of other sorts of materials for making this particular mechanical contact, but one of the reasons indium foil has been chosen is that it is soft, a good thermal conductor, and because it is metal and not oil-based or of some sort of pasty substance, it has no potential for contaminating the optical surfaces of the crystal 44. Plate 65 is attached to a thermo-electric cooler 69 of a type that is used in several parts of the preferred embodiment. Cooler 69 is in turn affixed to a heat reservoir 70 that is typically connected to a cooled metal plate 71 forming a support surface for the various laser components.

Figure 10A:
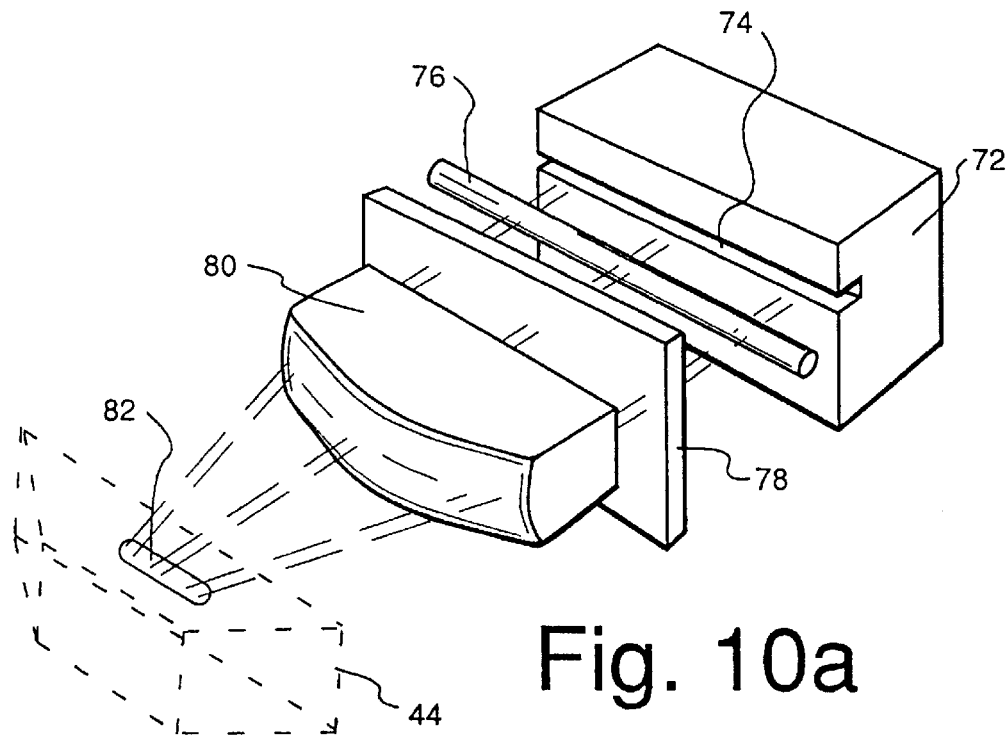
FIGS. 10a and 10b illustrate an improved laser pumping apparatus in accordance with the present invention.
Figure 10B:
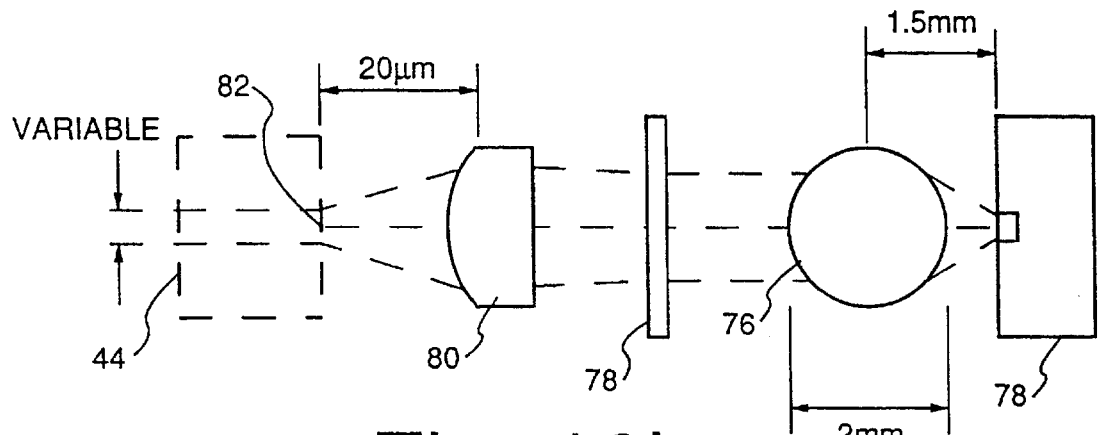

FIGS. 10a and 10b illustrate how a diode bar 72 is used to pump the crystal 44. The bar 72 has an emitting area 74 approximately 1 cm long by only a few microns in height, and its emitting area is a somewhat rectangular stripe across the upper half of the face of the bar. The element 76 is a 2 mm diameter fused silica rod which is used as a cylindrical lens to collimate the diode laser light in the vertical direction. Element 78 is a half-wave plate which takes the polarization of the laser light emitted from the diode bar and which initially starts off in the horizontal plane and causes it to be rotated into the vertical plane. The addition of this particular wave plate is necessitated by the orientation of the C-axis in the laser crystal itself, and although not crucial to pumping laser crystals per se, it helps absorb pump light in the shortest possible distance within the laser crystal itself. Element 80 is a conventional spherical lens that has been cut for ease of assembly.

FIG. 10b shows a side view of the various elements of FIG. 10a and the appropriate shape of the light that is emitted from the diode laser collimated and then refocused by the various lenses. As depicted, the center of the 2 mm diameter rod lens is spaced approximately 1.5 mm from the diode bar 72. This 1.5 mm position may be adjusted to control the height of the pumping spot 82 on the laser crystal 44. The spherical lens 80 has a relatively long focal length (in the preferred embodiment approximately 25 mm), and the net effect of the 2 mm focal length cylindrical lens 76 and the approximately 25 mm focal length spherical lens 80 causes a change in the spot size ranging from approximately 1 cm long by only a few microns high to a spot size at the laser crystal of approximately 5 mm length and between $100\mu$ to perhaps $400\mu$ in height.

Figure 11:
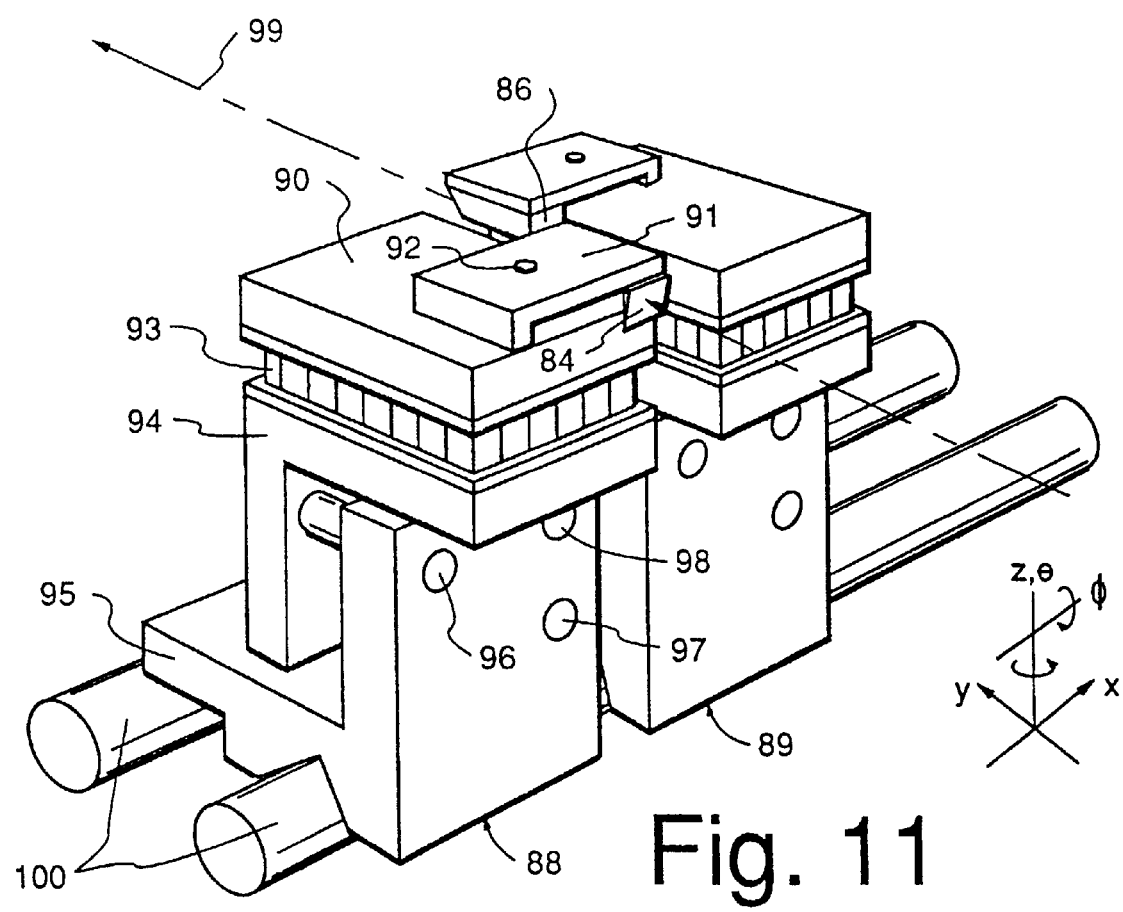
FIG. 11 depicts an improved doubler/tripler mount in accordance with the present invention.

In FIG. 11, mounts for the doubler and tripler crystals 84 and 86, respectively, are illustrated at 88 and 89. With the exception that the tripler mount 89 is rotated 180° with respect to the doubler mount 88, the two mounts are otherwise substantially identical to each other. Accordingly, for the sake of simplicity, only one-half of the assembly (namely, the doubler mount 88) will be described in detail. The doubler crystal 84, as shown in this figure, is approximately 2 mm square by 10 mm long. However, the length and dimensions of the crystal are determined solely by the spot sizes chosen for use in the laser itself. The crystal 84 sits on a copper block 90 and is held in place by an L-shaped clamp 91 that is fixed in position by a screw 92. This assembly rests upon and is affixed to the top of a thermoelectric cooler 93 which in turn sits on an angle-bracket shaped piece 94 which, in combination with a slider 95 and screw 96, 97, and 98, comprises an adjustable mirror mount for angularly adjusting the crystal 84 about two angular axes $\phi$ and $\theta$. Such mirror mounts are well known in laser art, but in this case the conventional mirror amount assemblies have been combined with thermoelectric cooler to both control the temperature and the angular orientation of the doubler and tripler crystals. Further, besides controlling the angle and temperature of the crystals, another objective of the mounts is to allow translation of the crystals laterally with respect to the laser axis 99 so that a portion of each crystal that is free of defects may be selected. To this end, the sliders of both assemblies rest on a pair of round rods 100 so that both the doubler crystal and the tripler crystal may be translated to select portions of the crystals that are free of defects and bubbles.

Turning now to FIG. 12, the concept of phase shift compensation in accordance with the present invention will be described. In this figure, a doubler 101 is depicted with a variety of intra-cavity fundamental and secondary beams extending from left to right and from right to left. Thus, specifically the fundamental beam which passes through the doubler going from right to left is shown at 102 along with the resultant second harmonic 103 (going from right to left) generated by the doubler, the returning fundamental beam 104 (going from left to right), and the second harmonic 105 generated by the returning fundamental 104. The recycled second harmonic light 106 originally starts as being 103 but is reflected by mirror 107 and returns back through the doubling crystal 101. Note that the fundamental beam 102 and second harmonic 103 get out of phase with each other because of the dispersion in air, and by the time the second harmonic and the fundamental strike mirror 107, there is some phase shift between these two beams. This phase shift may be further exacerbated by anti-reflection coatings which are used on the doubler or by coatings which are used on the mirror 107. At any rate, by the time the two second harmonic beams 105 and 106 arrive at the tripler (which is not shown in FIG. 12 but which resides immediately to the right of the doubler 101), the phase shift between the two second harmonic beams can cause some inefficiency in the second harmonic mixing in the tripler with the fundamental to generate the third harmonic.

One of the objectives of the present invention is to provide a means for compensating for this phase shift. It is well known that mirror coatings can be generated that can, in a relatively unpredictable way, compensate for the phase shift caused by dispersion in air. Although it is not easy to generate mirror coatings that can in any predictable way compensate for this phase shift, mirror coatings can be made that are known to be changing in a relatively uniform way from one side of the mirror coating to the other. Accordingly, if the phase shift coating changes over a sufficient degree from one side of the mirror to the other, the cavity mode can be selected to strike the mirror in various portions thereof in such a way as to compensate for the phase shift due to dispersion in air, and also for the phase shift that may be added by anti-reflection coatings on the doubler. However, because a curved mirror is used, if the mirror were to be merely translated from one side of the optical axis to the other in selecting a portion thereof that would have the proper phase compensating characteristics, this would misalign the laser. To eliminate such misalignment, the concave mirror 107 is mounted in a special mirror mount that performs the same two angular motions typical of most laser mirror mounts, yet has a third degree of freedom that allows the entire mirror mount to be pivoted about a point which is at the center of curvature of the mirror. This motion is depicted in FIG. 13 wherein the centralized position is shown by the solid lines 109 describing the mirror and the dashed lines 110 showing a perturbed position of the mirror. Since the curvature of the mirror is that curvature required to maintain alignment of the laser and since the allowed movement of the mirror is about its center of curvature by causing the coating 111 on the face of the mirror to vary from one extreme to the other across the mirror's surface, movement of the mirror will allow selection of the appropriate phase shift characteristics without effecting laser alignment.

In FIG. 14, a three-dimensional sketch is provided showing implementation of the mounting concept described above. A simple mirror mount well known in the art is illustrated at 114 and includes the mirror at 109 affixed to the center of the mount 114. The mount 114 is supported relative to a baseplate 116 by pins 118 which extend through a curved slot or track 120 in baseplate 116. The slot 120 is machined into baseplate 116 with a curvature about the point 113 such that as mount 114 is moved within slot 120, it causes mirror 109 to rotate about its center of curvature 112 in the manner illustrated in FIG. 13.

Although it is well known in the prior art that a phase shift exists between the fundamental and second harmonic in lasers of this type, and it is well known that mirror coatings can either add or subtract from the phase shift, there has heretofore been no suitable means provided for compensating for the phase shift in a predictable way. The described mechanism thus fulfills the long felt need for a means to conveniently allow selection of the appropriate coating characteristics to achieve optimal laser output power. The presently described apparatus provides the ability to reorient the concave mirror 109 in such a way as to not grossly disturb the alignment of the laser, thereby allowing the laser to be quickly brought up to optimal power, at which point the laser output is observed and a conclusion may be reached as to whether or not the mirror has been moved to a position which is better or worse that its previous position. Means (not shown) are provided for locking the mirror in a finally chosen position.

Referring now to FIG. 15, a Q-switch mounting assembly is illustrated for supporting a commercially available acousto-optic Q-switch 121 through which the optical beam 122 propagates. RF electrical power to operate the switch is applied at 124. Said RF power is deposited within the switch and is converted into heat, which must be removed. The objective of this assembly is to provide a means for allowing both angular and translational adjustment of the switch 121 and to provide good mechanical coupling to a cooled plate 71 to remove heat from the Q-switch. Switch 121 is secured to a first plate 128 having a centrally located bore 129 and at least one arcuate slot 130, the radius of which passes through the center of bore 129. Plate 128 rests upon a second plate 132 having a pin 131 protruding from its upper surface for engagement with bore 129 to allow angular orientation of plate 128 with respect to plate 132. A screw 133 extends through slot 130 and into a tapped bore 134 to secure the plates together. The facing and engaging surfaces of plates 128 and 132 are machined very flat so that by rotation of plate 128 about pin 131, angular $\theta$ adjustments of switch 121 can be accomplished and, at the same time, provide intimate thermal contact between plates 128 and 132. In order to permit translation of the Q-switch in the vertical direction Z, plate 132 is secured to the upper block 136 of a pair of wedge-shaped blocks 136 and 138. As indicated, block 138 has a transversely extending groove 139 extending thereacross for receiving a transversely extending tongue 137 formed in the lower surface of wedge 136, the two serving to maintain alignment of the blocks as block 136 is moved up or down the surface of block 138. Although relative motion of these blocks to provide Z axis adjustment also causes a translation of switch 121 along the axis of beam 122, such axial translation is irrelevant to the operation of the switch as the cavity mode spot size changes little over the translation distance. As with the mating surfaces of plates 128 and 132, the mating surfaces of blocks 136 and 138 are machined flat to close tolerances so that good thermal contact is maintained all the way down through block 138. Finally, in order to allow translation of switch 121 in the X direction, the horizontal bottom surface of block 138 is provided with a slot 140 extending in the X direction and adapted to mate with a tongue 142 provided in the upper surface of a flat block 144. Again, good thermal contact is needed between blocks 138 and 144, and this is achieved by providing a high degree of precision and flatness in the machining of the engaging surfaces. Heat is extracted from the entire assembly by placing block 144 on top of and in engagement with thermoelectric coolers 146 which remove heat from the assembly and deposit it into the cooled baseplate 71 common to all elements within the laser device.

As suggested above, the present invention utilizes a small waist (approximately 60 microns) for the LBO doubler/tripler pair (D and T respectively) which is formed by the combination of the intra-cavity lens L1 and the concave mirror M1. A large cavity mode (approximately 500 microns) is maintained within the Nd:YVO4 slab S to provide efficient mode overlap with the broad pump volume offered by the focused diode bar. The choice of pump volume is critical to achieving a uniform thermal lens within the slab and is described in a later section. Finally, the combination of the thermal lens within the Nd:YVO4 and a portion of the focusing power of the lens L1 are used to form a second small waist at the flat mirror M2. An acousto-optic Q-switch is placed near the second waist; placement near the waist reduces the RF power requirements of the switch. TEM$_{00}$ operation is selected by an appropriate ratio of the cavity mode size to the aperture represented by the Nd:YVO4 slab.

The third harmonic radiation, polarized coplanar to the fundamental radiation, is extracted with negligible loss by the combination of the intra-cavity Brewster prism P and the beam pick-off mirror M3. This UV extraction technique was selected over other schemes that use dichroic mirrors to reduce the optical loss and complexity normally associated with such mirror coatings. The present technique does require some space within the cavity to allow sufficient separation of the third harmonic from the fundamental but this space is useful for enforcing radically different spot sizes between the gain medium and doubler/tripler pair.

The intra-cavity lens L1 and the concave mirror M1 are the dominant elements within the laser that control cavity stability. As a result, a wide range of thermal lensing power within the vanadate slab are acceptable and induce only small changes in the cavity mode size at the Nd:YVO4 slab and even smaller changes at the doubler/tripler waist. For example, computer modeling shows that the focal length of the thermal lens may change from 200 mm to 400 mm with less than ten percent (10%) change in the cavity mode size at the Nd:YVO4 slab.

The gain region within a slab pumped by diode bar arrays usually takes the form of a rectangular block; the length of the block being fixed by the length of the diode bar, the depth of the block fixed by the absorption depth of the pump illumination and the height of the block determined by the collimating optics placed in front of the diode bar. In some embodiments, the depth and height of the gain region are made roughly equal where in other schemes, the gain region takes the form of a thin sheet. All of these schemes suffer from poor efficiency because of the poor overlap between the desired $TEM_{00}$ cavity mode at the center of the slab and the unused gain regions nearer the sides of the slab. When the gain region takes the form of a thin sheet, improvements can be made in efficiency if elliptical cavity modes are employed. However, these designs require cylindrical intra-cavity elements (lenses or mirrors) to both create these elliptical modes and to compensate for the astigmatic thermal lens generated by the thin pumped region, which adds to cavity complexity. Therefore, an objective of the present invention was to design a scheme that both improves pump efficiency while at the same time maintaining a thermal lens that is symmetric.

In the present design, and as illustrated in FIGS. 7a–7c, the pumping efficiency of the side-pumped system is improved by internally reflecting the cavity mode off of the slab wall that serves as the pump face, thereby placing the cavity mode within the region of greatest pump absorption. Of course, this technique is especially useful with materials such as Nd:YVO4 that exhibit short pump absorption lengths. In the present work, the output from the SDL 20 Watt diode bar is first collimated by the 2 mm diameter rod lens L3 and then focused by the 25 mm f.l. lens L2 to a rectangular spot approximately 5 mm in length by 1 mm wide (a half-wave-plate W rotates the pump polarization into alignment with the c-axis of the Nd:YVO4 slab). Because of the poor optical beam quality of the diode bar output, it is difficult to focus the diode bar output to a spot much shorter in length than 5 mm. Therefore, the long axis of the rectangular pump spot is aligned with the plane of reflection within the slab, and a shallow angle of reflection is chosen so that the projection of the $TEM_{00}$ mode onto the pump face is roughly equal to or slightly longer than the length of the rectangular pump spot This internal reflection also symmetrizes the otherwise asymmetric thermal lens, caused by the rapidly-decreasing pump illumination away from the pump face, that would otherwise occur across the beam profile (in the plane of the reflection).

Further improvement in thermal asymmetry is obtained by giving careful consideration to the size of the pumped volume compared with the slab dimensions and with the absorption length of the pump illumination. An extensive body of work has described the thermal lensing in uniformly-pumped slab lasers cooled from two opposing faces. The uniform pump loading and cooling boundary conditions induce a thermal lens that is generally cylindrical, having lensing power only in the plane perpendicular to the cooled surfaces. In the present design, the Nd:YVO4 slab is cooled along two opposing horizontal surfaces by intimate contact with a cooled mounting fixture of the type depicted in FIG. 9. These cooled faces are perpendicular to the face simultaneously used for the intra-cavity reflection and pump input. If the pump absorption length were comparable to the width of the slab, then the slab would exhibit a largely cylindrical thermal lens in the vertical direction. However, because of the short pump absorption length of Nd:YVO4, the pump loading is highly non-uniform and is concentrated near the pumped face. This effect can be used to add lensing power in the horizontal direction in addition to the already present vertical lensing mentioned earlier. For a given pump absorption length (set by the Nd doping and pump line width), computer modeling shows that a pump spot that is too narrow generates a thermal lens with excessive power in the vertical direction, while a pump spot that is too wide generates insufficient power in the vertical direction when compared to the lensing power in the horizontal direction The nearly symmetric thermal lens that is achieved with proper pump spot width simplifies cavity design, especially when a wide variation in cavity mode size is required within a short cavity. Indeed, the thermal lens may be tailored to be slightly astigmatic to compensate for the mild astigmatism induced by the intra-cavity Brewster prism P. Finally, the diode bar and side-pumping optics are less expensive, more easily assembled and aligned, and less failure-prone than the fiber-coupled diode-bar assemblies used in some end-pumped geometries.

Room-temperature, angle-tuned phase matched Type I doubling and Type II tripling (sum-frequency generation) in LBO are used in the preferred embodiment to generate the third harmonic radiation. As depicted in FIG. 11, both crystals (10 mm in length) are mounted on temperature-controlled platforms, each of which may be adjusted in two perpendicular axes of rotation and one axis of translation. Rotation insures that phase matching is achieved near room temperature and translation selects a portion of the crystal free of defects. The doubler generates a second harmonic beam which exits from each of its ends. The beam which exits the doubler face closest to the tripler is easily summed with the intra-cavity second harmonic to generate radiation at the third harmonic of the fundamental. The beam which exits the doubler face opposite the tripler would be lost were it not for the mirror coating on M1 which is designed to reflect both the fundamental and second harmonic beams, thereby recycling the second harmonic. However, due to dispersion in the air path between the mirror and doubler/tripler pair, a phase shift can occur between the second harmonic and fundamental, reducing the efficiency of sum frequency generation in the tripler. Additional phase shifts may occur in the AR coatings on the faces of the doubler. As pointed out above, this phase shift may be canceled by an appropriate coating on M1 that is specifically designed to compensate for the calculated phase shift. However, a coating with predictable reflected phase difference between the fundamental and second harmonic is difficult to obtain and is likely to not account for a potentially unknown additional phase shift at the doubler face. As illustrated in FIGS. 13 and 14, the solution is to apply a coating to mirror M1 whose phase shift is known to vary arbitrarily across the face of the mirror. Indeed, such shifts are almost inevitable in the coating process because of the short radius of curvature of the mirror but this phase shift may be enhanced in a particular direction. Then the mirror may be oriented such that the intra-cavity beam strikes a portion of the mirror face with the appropriate phase shift. This adjustment is most easily enabled by using a mirror mount on a semicircular track whose center of curvature is coincident with the center of curvature of Ml. Therefore, motion of the mount along this track maintains the angular orientation of the concave mirror within the laser cavity while causing the intra-cavity beam to be reflected off of different portions of the mirror. Preferentially, the mirror is oriented so that the direction of the phase shift gradient is parallel to the plane of the semicircular mirror mount track. In this way, the mirror mount may be adjusted along the semicircular track for greatest third harmonic conversion efficiency without grossly misaligning the laser cavity.

The laser is assembled into a sealed, dry enclosure roughly 175 mm×450 mm×100 mm containing all optical components, including the diode bar. The sealed enclosure reduces the risk of optical damage caused by the buildup of contaminants from room air and allows cooling of the diode bar to temperatures that would otherwise be below the dew point. Cooling is applied to the exterior of the enclosure and heat is transferred from various internal electrical and optical components via thermoelectric coolers. The power supply and control electronics are housed in an auxiliary 19" rack-style enclosure. Total electrical power consumption in worst-case conditions is roughly 600 Watts.

The laser system of the present invention generates over 2 Watts maximum average power at 355 nm and operates at repetition rates in excess of 100 kHz. The system uses a Nd:YVO4 slab pumped by a 20 watt diode bar and incorporates intra-cavity Type I and Type II LBO angle-tuned doubling and tripling respectively. Novel features that contribute to the success of this system are UV extraction via intra-cavity Brewster prism, a Nd:YVO4 side-pumped slab whose pump profile is carefully tailored to reduce asymmetry in the thermal lens, a cavity inherently insensitive to thermal lensing in the gain medium and dispersion compensation for second harmonic recycling.

Although the present invention has been described above in terms of a specific embodiment, it is anticipated that alterations and modifications thereof will no doubt become apparent to those skilled in the art. For example, for lower power CW laser applications, the Q-switch could be omitted. It is therefore intended that the following claims be interpreted as covering all such alterations and modifications as fall within the true spirit and scope of the invention.

What is claimed is:

1. An intra-cavity tripled diode pumped laser comprising:
   first and second spaced apart reflector means defining a resonator cavity;
   a laser crystal disposed within said resonator cavity;
   a doubler crystal disposed within said resonator cavity;
   a tripler crystal disposed within said resonator cavity; and
   diode pumping means for pumping the laser crystal to produce radiation at the fundamental wave length thereof, said fundamental radiation being directed into said doubler crystal to produce second harmonic radiation, and said fundamental radiation and said second harmonic radiation being directed into said tripler crystal to develop third harmonic radiation by sum frequency mixing of said fundamental radiation and said second harmonic radiation, said third harmonic radiation being separated and output from said resonator cavity as an output laser beam.

2. An intra-cavity tripled diode pumped laser as recited in claim 1, and further comprising a Q-switch disposed within said resonator cavity.

3. An intra-cavity tripled diode pumped laser as recited in claim 2, and further comprising thermo-electric cooling means for supporting and aliging said Q-switch and for removing heat therefrom.

4. An intra-cavity tripled diode pumped laser as recited in claim 3, wherein at least one of said first and second reflector means is coated with a material that exhibits an optical phase shift characteristic varying across the mirror's surface, the coated reflector means being positioned to compensate for the dispersion in air of said second harmonic radiation, thereby optimizing the effective second harmonic power available for input to the tripler crystal.

5. An intra-cavity tripled diode pumped laser as recited in claim 4 wherein at least one of the coated reflector means is concave in configuration and is supported by a holder that is rotatable about a point lying along said lasing axis, thereby allowing positional adjustment of said one coated reflector means relative to said lasing axis to select an optimum phase shift characteristic without detuning the laser.

6. An intra-cavity tripled diode pumped laser as recited in claim 5, wherein said laser crystal is elongated and has a rectangular transverse cross-section defined by a pumping side surface, an opposite side surface, a top surface, and a bottom surface, and having end faces which intersect said pumped side surface at an acute angle, and wherein the cavity mode propagating through the crystal intersects and is reflected at said pumped side surface midway along the length of said crystal, said cavity mode of said fundamental radiation being focused to a first spot on said pumped side surface, said first spot being generally elliptical in shape, having a major axis in the direction of the length of said pumped side surface, and the length of said major axis being less than the length of said pumped side surface.

7. An intra-cavity tripled diode pumped laser as recited in claim 6, and further comprising means for cooling said top and bottom surfaces of said laser crystal such that said crystal is symmetrically cooled to both sides of its longitudinal center, said cooling means including mechanical clamping means intimately and uniformly engaging substantial portions of said top surface and said bottom surface of said laser crystal.

8. An intra-cavity tripled diode pumped laser as recited in claim 7 wherein said diode pumping means generates a pumping beam that is focused by focusing means to a generally elliptical second spot on said pumped side surface, the length of said second spot being shorter than the length of the emitting area of said diode pumping means and being tailored in conjunction with the pumping beam absorption length across said laser crystal to yield substantially equal thermal lensing power in the transverse vertical and horizontal directions across said laser crystal, thereby eliminating the need for astigmatic cavity characteristics.

9. An intra-cavity tripled diode pumped laser as recited in claim 8, and further comprising a prism disposed within said cavity for separating said third harmonic radiation from said fundamental radiation and said second harmonic radiation and said second harmonic radiation.

10. An intracavity tripled diode laser as recited in claim 9 wherein said focusing means includes a cylindrical lens means, a means for aligning the polarization of the pump radiation with the optical axis of the laser crystal, and a spherical lens means all cooperatively functioning to focus said radiation onto said pumped side surface.

11. An intra-cavity tripled diode pumped laser as recited in claim 1, wherein a reflective surface of at least one of said first and second reflector means is coated with a material that exhibits an optical phase shift characteristic varying across the coated surface, the coated reflector means being positioned to compensate for the dispersion in air of said second harmonic radiation, thereby optimizing the effective second harmonic power available for input to the tripler crystal.

12. An intra-cavity tripled diode pumped laser as recited in claim 11 wherein at least one of the coated reflector means is laterally movable relative to the lasing axis of said laser so as to permit selection of an optimum phase shift characteristic.

13. An intra-cavity tripled diode pumped laser as recited in claim 12 wherein at least one of the coated reflector means is concave in configuration and is supported by a holder that is rotatable about a point living along said lasing axis, thereby allowing positional adjustment to select said optimum phase shift characteristic without detuning the laser.

14. An intra-cavity tripled diode pumped laser as recited in claim 13 wherein means are provided for thermally cooling at least one of said doubler crystal and said tripler crystal.

15. An intra-cavity tripled diode pumped laser as recited in claim 13 wherein said doubler crystal is positioned between said first reflector means and said laser crystal, and wherein said tripler crystal is disposed between said doubler crystal and said laser crystal, and further comprising a Q-switch disposed within said resonator cavity.

16. An intra-cavity tripled diode pumped laser as recited in claim 13, and further comprising a prism disposed within said cavity and between said tripler crystal and said laser crystal for separating said third harmonic radiation from said fundamental radiation and second harmonic radiation.

17. An intra-cavity tripled diode pumped laser as recited in claim 13 wherein said laser crystal is elongated and has a rectangular transverse cross-section defined by a pumping side surface and opposite side surface, a top surface and a bottom surface, and has end faces which intersect said pumped side surface at an acute angle, and wherein the cavity mode propagating through said laser crystal intersects and is reflected at said pump side surface midway along the length of said laser crystal.

18. An intra-cavity tripled diode pumped laser as recited in claim 17, and further comprising cooling means for cooling said top surface and said bottom surface such that said laser crystal is symmetrically cooled to either side of its longitudinal center, and wherein said cooling means includes mechanical clamping means intimately and uniformly engaging substantial portions of said top surface and said bottom surface for removing heat therefrom.

19. An intra-cavity tripled diode pumped laser as recited in claim 18 wherein said diode pumping means generates a pumping beam that is focused to a generally elliptical spot on said pumped side surface, the length of said spot being shorter than the length of the emitting area of said diode pumping means, and wherein the length of said pumping spot is tailored in conjunction with the pumping beam absorption length across said laser crystal to yield substantially equal thermal lensing power in the transverse vertical and horizontal directions across said laser crystal, thereby eliminating the need for astigmatic lensing corrections.

20. An intra-cavity tripled diode pumped laser as recited in claim 19, and further comprising a Q-switch disposed within said resonator cavity.

21. An intra-cavity tripled diode pumped laser as recited in claim 20, and further comprising thermoelectric cooling means for supporting and aligning said Q-switch and for removing heat therefrom.

22. An intra-cavity tripled diode pumped laser as recited in claim 1, wherein said laser crystal is elongated and has a rectangular transverse cross-section defined by a pumping side surface, an opposite side surface, a top surface, and a bottom surface, and having end faces which intersect said pumped side surface at an acute angle, and wherein the cavity mode propagating through the crystal intersects and is reflected at said pumped side surface midway along the length of said crystal.

23. An intra-cavity tripled diode pumped laser as recited in claim 22 and further comprising means for cooling said top and bottom surfaces of said laser crystal such that said crystal is symmetrically cooled to both sides of its longitudinal center.

24. An intra-cavity tripled diode pumped laser as recited in claim 23 wherein said cooling means includes mechanical clamping means intimately and uniformly engaging substantial portions of said top surface and said bottom surface.

25. An intra-cavity tripled diode pumped laser as recited in claim 22 wherein said cavity mode of said fundamental radiation is focused to a spot on said pumped side surface and wherein said spot is generally elliptical in shape, having a major axis in the direction of the length of said pumped side surface, and wherein the length of said major axis is less than the length of said pumped side surface.

26. An intra-cavity tripled diode pumped laser as recited in claim 24 wherein said diode pumping means generates a pumping beam that is focused to a generally elliptical spot on said pumped side surface, the length of said spot being shorter than the length of the emitting area of said diode pumping means.

27. An intra-cavity tripled diode pumped laser as recited in claim 26 wherein the length of the pumping spot is tailored in conjunction with the pumping beam absorption length across said laser crystal to yield substantially equal thermal lensing power in the transverse vertical and horizontal directions across said laser crystal, thereby eliminating the need for astigmatic cavity characteristics.

28. An intracavity tripled diode laser as recited in claim 27 wherein said focusing means includes a cylindrical lens means, a means for aligning the polarization of the pump radiation with the optical axis of the laser crystal, and a spherical lens means all cooperatively functioning to focus said radiation onto said pumped side surface.

29. An intra-cavity tripled diode pumped laser as recited in claim 1, and further comprising a prism disposed within said cavity for separating said third harmonic radiation from said fundamental radiation and said second harmonic radiation.

30. An intra-cavity tripled diode pumped laser as recited in claim 1 wherein said laser crystal is of Neodymium yttrium orthovanadate (Nd:YVO4).

31. An intra-cavity tripled diode pumped laser as recited in claim 1 wherein means are provided for thermally cooling at least one of said doubler crystal and said tripler crystal.

32. An intra-cavity tripled diode pumped laser as recited in claim 1 wherein said doubler crystal is positioned between said first reflector means and said laser crystal, and wherein said tripler crystal is disposed between said doubler crystal and said laser crystal, and further comprising a Q-switch disposed within said resonator cavity.

33. An intra-cavity tripled diode pumped laser as recited in claim 32 and further comprising a prism disposed within said cavity and between said tripler crystal and said laser crystal for separating said third harmonic radiation from said fundamental radiation and second harmonic radiation.

34. An intra-cavity tripled diode pumped laser as recited in claim 33 wherein said laser crystal is elongated and has a rectangular transverse cross-section defined by a pumping side surface and opposite side surface, a top surface and a bottom surface, and has end faces which intersect said pumped side surface at an acute angle, and wherein the cavity mode propagating through said laser crystal intersects and is reflected at said pump side surface midway along the length of said laser crystal.

35. An intra-cavity tripled diode pumped laser as recited in claim 34 and further comprising cooling means for cooling said top surface and said bottom surface such that said laser crystal is symmetrically cooled to either side of its longitudinal center, and wherein said cooling means includes mechanical clamping means intimately and uniformly engaging substantial portions of said top surface and said bottom surface for removing heat therefrom.

36. An intra-cavity tripled diode pumped laser as recited in claim 35 wherein said diode pumping means generates a pumping beam that is focused to a generally elliptical spot on said pumped side surface, the length of said spot being shorter than the length of the emitting area of said diode pumping means, and wherein the length of said pumping spot is tailored in conjunction with the pumping beam absorption length across said laser crystal to yield substantially equal thermal lensing power in the transverse vertical and horizontal directions across said laser crystal, thereby eliminating the need for astigmatic lensing correction.

37. A method of generating third harmonic radiation of a particular fundamental wavelength comprising the steps of:

providing first and second spaced apart reflector means defining a resonator cavity;

positioning within said cavity a laser crystal capable of being excited at said fundamental wavelength, a doubler crystal and a tripler crystal;

providing pumping means for pumping the laser crystal to produce radiation within said cavity at the fundamental wavelength thereof;

directing said fundamental radiation into said doubler crystal to produce second harmonic radiation;

directing said second harmonic radiation and said fundamental radiation into said tripler crystal to develop third harmonic radiation by a sum of the frequency mixing of said fundamental radiation and said second harmonic radiation; and separating said third harmonic radiation for output from said resonator cavity as an output laser beam.

38. A method as recited in claim 37 and further comprising the steps of:

disposing a Q-switch within said resonator cavity; and driving said Q-switch with RF energy to cause said laser to generate pulses of high energy at the third harmonic wavelength.

39. A method as recited in claim 37 and further comprising the steps of:

coating at least one of said first and second reflector means with a material that exhibits an optical phase shift characteristic varying across the coated surface; and positioning the coated reflector means to compensate for the dispersion in air of said second harmonic radiation, thereby optimizing the effective second harmonic power available for input to the tripler crystal.

40. A method as recited in claim 39 wherein said coated reflector means is concave in configuration and is supported by a holder that is rotatable about a point lying along the lasing axis of the laser, and further comprising the step of rotating the coated reflector means about said point to select an optimum phase shift characteristic without detuning the laser.

41. A method as recited in claim 37 wherein said laser crystal is elongated and includes a flat, pumped surface that is intersected by and reflects the cavity mode propagating through the laser crystal, and further comprising the steps of:

cooling the surfaces of said laser crystal above and below said pumped surface so that the crystal is symmetrically cooled to both sides of its longitudinal center; and causing said pumping means to generate a pumping beam that is focused to a generally elliptical spot on said pumped surface, the elliptical dimensions of the pumping spot being tailored in conjunction with the pumping beam absorption length across the laser crystal to yield substantially equal lensing power in the transverse vertical and horizontal directions across the laser crystal, thereby eliminating the need for astigmatic cavity characteristics.

42. A method as recited in claim 37 and further comprising the step of disposing a prism within said resonator cavity for separating said third harmonic radiation from said fundamental radiation and said second harmonic radiation.

* * * * *